United States Patent [19]

Fanguy

[11] Patent Number: 5,596,949
[45] Date of Patent: Jan. 28, 1997

[54] HEMISPHERE-BELT FLOOR SYSTEM

[75] Inventor: Roy C. Fanguy, College Station, Tex.

[73] Assignee: The Texas A&M University System, College Station, Tex.

[21] Appl. No.: 312,713

[22] Filed: Sep. 27, 1994

[51] Int. Cl.$^6$ .............................. A01K 1/01; A01K 31/04
[52] U.S. Cl. ...................... 119/458; 119/480; 119/458; 119/479
[58] Field of Search ............................ 119/17, 164, 845, 119/846, 22, 28, 439, 455, 458

[56] References Cited

U.S. PATENT DOCUMENTS

| | | | |
|---|---|---|---|
| 360,928 | 4/1887 | Tebbutt | 119/28 X |
| 3,978,819 | 9/1976 | Lovitt | 119/17 X |
| 4,020,793 | 5/1977 | Morrison | 119/479 |
| 4,023,531 | 5/1977 | Thompson | 119/17 X |
| 4,148,276 | 4/1979 | Schmidt | 119/22 X |
| 4,211,185 | 6/1980 | Karlsson | 119/28 |
| 4,437,433 | 3/1984 | Nijhof | 119/22 X |

FOREIGN PATENT DOCUMENTS

| | | | |
|---|---|---|---|
| 2118100 | 10/1971 | Germany . | |
| 2320623 | 11/1973 | Germany | 119/28 |
| 9101021 | 1/1992 | Germany . | |
| 2254235A | 10/1992 | United Kingdom . | |

*Primary Examiner*—Robert P. Swiatek
*Assistant Examiner*—Elizabeth Shaw
*Attorney, Agent, or Firm*—Rosenblatt & Redano P.C.

[57] ABSTRACT

A conveyor belt having raised hemispheres serves as the floor for caged production of poultry. The belt is preferably molded plastic and moves continuously at a speed undetectable by the birds, allowing complete removal of manure before manure build-up becomes appreciable. The conveyor belt's direction of movement may also be reversed at variable speeds, automatically conveying the birds to catch crews.

24 Claims, 4 Drawing Sheets

HEMISPHERE-BELT FLOOR SYSTEM

FIELD OF THE INVENTION

The present invention relates to commercial production of poultry, and particularly to production of broilers where market weights exceed 3 pounds.

BACKGROUND OF THE INVENTION

Cage production of broilers has been practiced by the commercial industry since the early 1900's using simple wire cages. Such production met reasonable commercial success as long as live market weights did not exceed 3 pounds. Advances in genetics and nutrition, however, have resulted in live market weights ranging from 3–5 pounds. Birds of this weight, when reared on wire floors or other flat floors, experience a high incidence of foot and leg problems, making them unthrifty. These birds also experience a high incidence of breast blisters caused by resting their keel (breast) bones on flat or sharp surfaces. This adversely affects their market value.

Because of these problems with wire cages, most of the commercial industry in the United States produces broilers using floor pens littered with wood shavings or some other flooring material. This reduces foot and leg problems, as well as breast blisters, to an acceptable level, but creates other problems of concern to the industry. Commercial production of particle board impacts availability and cost of wood shavings as litter. This increases the cost of production, particularly if the litter is not reused. Built-up (reused) litter contains increased disease levels, requiring feed medication to control coccidosis and other diseases. Ultimate disposal of contaminated litter is itself a problem, as are the costs associated with down-time necessary for clean-up and relittering.

Bird production using the litter system is limited to a single level. Multi-level battery brooding cages use wire floors and a separate conveyor belt below to remove manure. Furthermore, at market age the birds must be physically pulled from the cages and carried to waiting bird haul trucks by catch crews, which may result in considerable carcass damage if not done properly. This system, used in Europe, causes considerable mortality in addition to the other problems associated with wire floors, particularly when the birds reach the 3–5 pound weight range. Since this is the current weight range of commercial broilers in the U.S., this system has not been accepted in the U.S. The preferred system in the U.S. continues to be the litter system.

SUMMARY OF THE INVENTION

In response to the problems identified, a floor having raised hemispheres was developed for use in poultry production cages. The varying contours of this floor preclude the birds from resting their keel (breast) bone on any flat or sharp surface, thus preventing the development of breast blisters at higher live body weights. This floor is preferably molded polypropylene, polyethylene, or acetal, all of which resist degradation by poultry manure. The floor may take the form of a conveyor belt, moving continuously at a speed undetectable by the birds while allowing complete removal of manure before manure build-up becomes appreciable. Neither litter nor feed coccidiastat medication is required for rearing birds on the proposed belt floor system. The conveyor belt's direction of movement may also be reversed at variable speeds, automatically conveying the birds to catch crews. This hemisphere-belt floor system may be used in multi-level production of commercial broilers.

DETAILED DESCRIPTION OF THE PREFERRED EMBODIMENT

Figure 1:
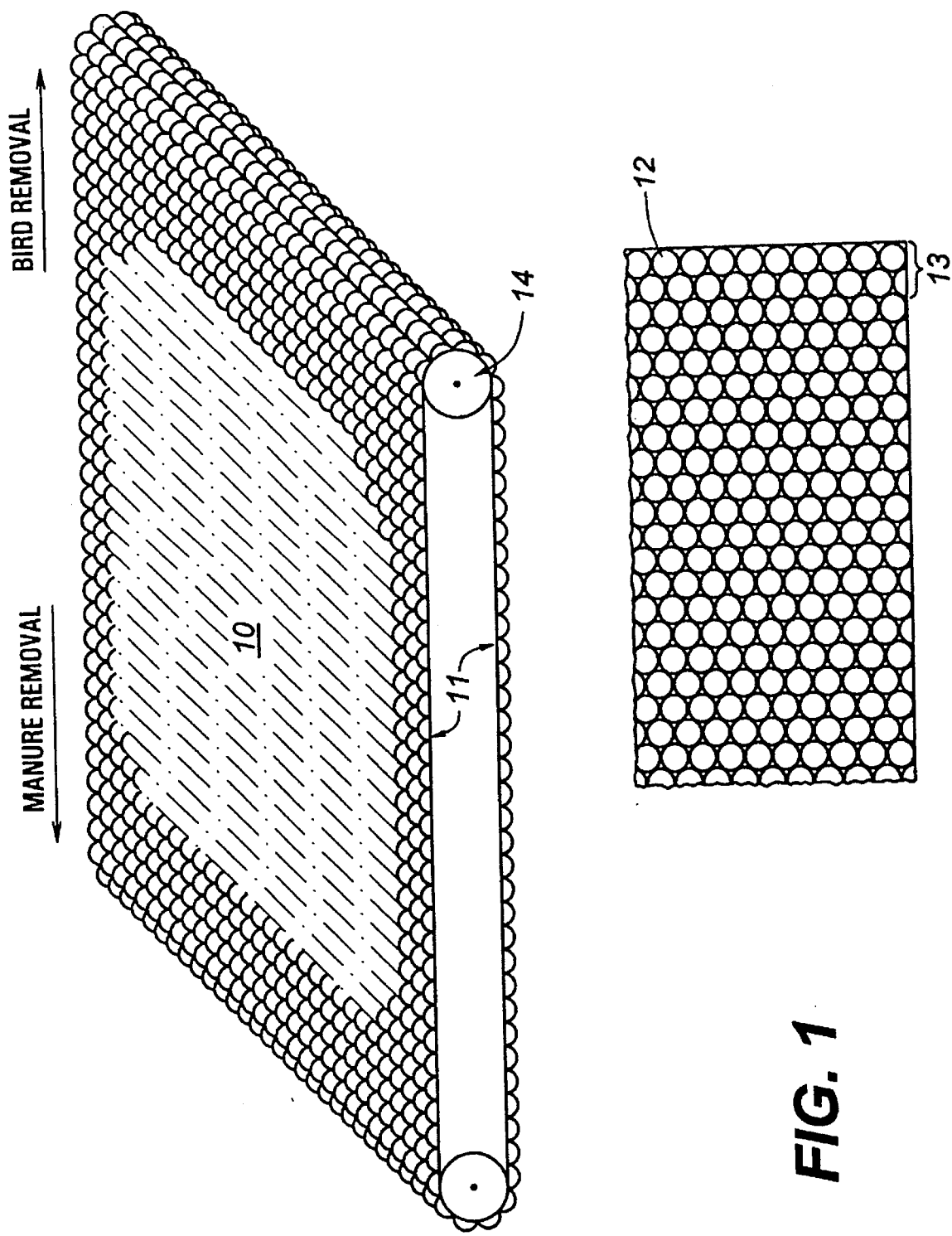
FIG. 1 depicts the hemisphere-belt floor system of the present invention, showing the preferred embodiment's offset contiguous rows of raised hemispheres.

The raised hemisphere floor 10 depicted in FIG. 1 is preferably molded polypropylene, polyethylene, or acetal, which have been found to be highly resistant to degradation by poultry manure. The raised hemispheres 12 are approximately 2" in diameter and are arranged in successive offset contiguous rows 13. This continuously varying floor surface precludes the birds from resting their keel bone on any flat or sharp surface, preventing the development of breast blisters during the 4–6 week period of growth when live body weights exceed 3 pounds. The hemispheres also provide a floor surface in closer conformity to the natural shape of the birds' feet, preventing the development of foot and leg problems commonly accompanying use of wire floors. Use of a molded plastic floor also causes less callusing and bruising of the birds' feet. Consequently, a higher percentage of the feet will be acceptable in markets where chicken feet (praws) are considered a delicacy.

In the preferred embodiment, a frame 35 forms a barrier which restricts the birds to the moving floor 10 which has raised hemispheres. The raised hemisphere floor is preferably a conveyor belt 11 which also serves as a continuous manure removal system. The hemisphere-belt floor is driven by a motor connected to rollers 14 and moves continuously at a speed undetectable by the birds. Speeds of approximately 1"/minute have been found acceptable. Use of such a continuously moving conveyor belt allows removal of manure before manure buildup becomes appreciable. Speeds of approximately 1"/minute, for example, will result in complete removal of manure from a 34-ft length of the conveyor belt in a 6-hour period. Manure build-up over a 6-hour period is negligible even at market age. Most of the manure drops off the conveyor belt into chute 34. It is preferred that manure be entirely removed from the structure by manure removal belt 24. Thus, manure removal is continuous and, because no litter is used, the volume of waste requiring disposal is considerably reduced. Furthermore, the waste is primarily moisture, and thus may be further reduced by allowing the manure to air dry at an appropriate location outside the bird-rearing complex.

Down-time required for clean-up between broods is also substantially less than down-time required for clean-up and re-littering under the current litter floor system. Since manure is continuously removed, only 1–2 days is required for clean-up between consecutive broiler groups, as compared with approximately 10 days required for clean-up and relittering under the litter floor system. This savings in down-time will increase the number of broods which can be raised in a given facility each year.

The hemisphere-belt floor system improves or at least approximately maintains both the average live weight at market age and feed conversion over results from the litter floor system, while reducing mortality of the birds.

The hemisphere-belt floor system may also be designed for conveyor belt movement in both directions (22, 23). By reversing the direction of the conveyor belt, preferably at variable speed, the birds may be conveyed by the same conveyor belt floor to waiting catch crews for loading when they reach market age. This minimizes bird handling by the catch crews, reducing both bird stress and the likelihood of carcass damage. A central aisle 20 may be provided for the bird-haul truck 21. The bird-haul truck may be pulled down this aisle by a cable at a speed regulated by the catch crews. Birds may then be simultaneously loaded onto both sides of the truck.

Figure 3:
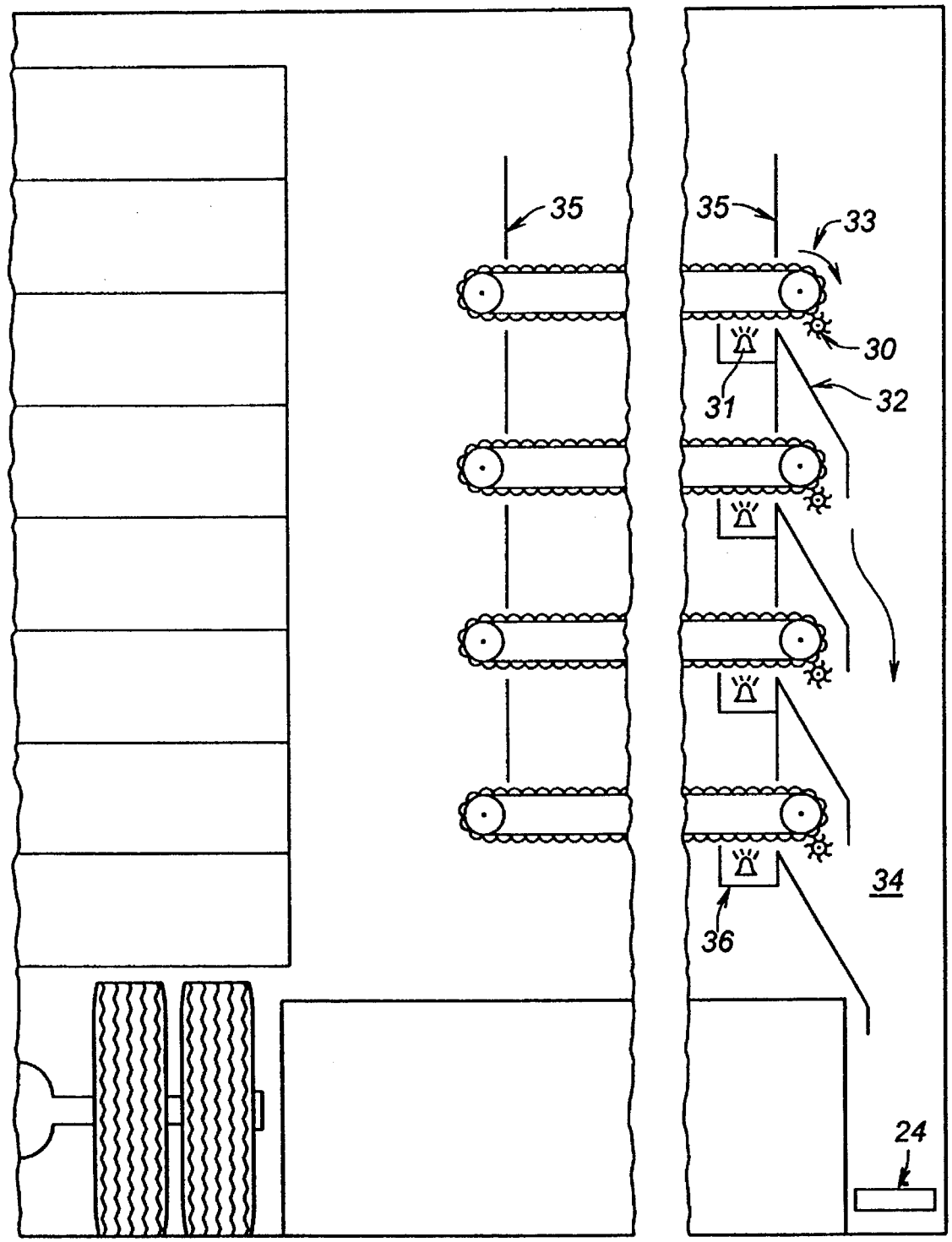
FIG. 3 is a side-view diagram of a proposed layout for multi-level production units using the hemisphere-belt floor system.

Another substantial improvement of the hemisphere-belt floor system is its adaptability to multi-level production. This allows increased production in each roofed structure on a given farm over single level production necessary for the current litter floor system. The use of at least four levels, as depicted in FIG. 3, is preferred. Dry manure on the belt falls off as the belt 33 moves. The belt is then cleaned via brushes 30 and pressure spray nozzles 31. Effluent from the washing 36 contains very little manure and may be processed through a series of lagoons after removal from the structure.

Figure 4:
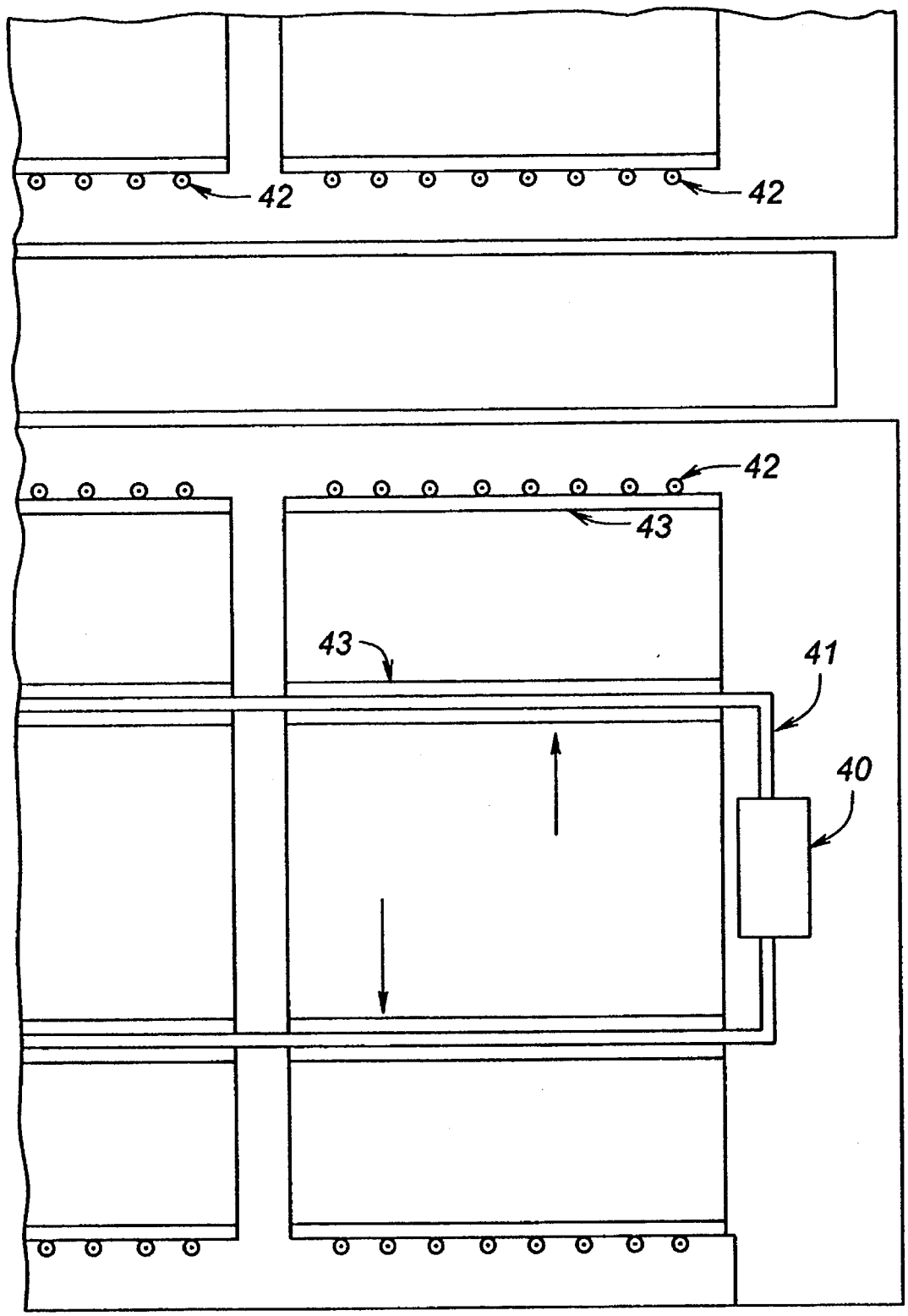
FIG. 4 is a plan view detail of FIG. 2 further illustrating the system for feed and water distribution to each level.

Multi-level brooding cages currently available provide an unacceptable trade off in marketability of the birds for increased production, as evidenced by continued predominant use of the single level, litter floor system. The hemisphere-belt floor system, however, overcomes the problems inherent to use of multi-level, wire floor brooding cages. Use of multiple levels of the hemisphere-belt floor system will concentrate production under a single roofed structure, simplifying management, feed distribution, and bird-haul operations. FIG. 4 shows one arrangement of feed troughs 41 and watering points 42 which may be used, as well as removable wooden runners 43 which may be provided for birds less than one week old.

Figure 2:
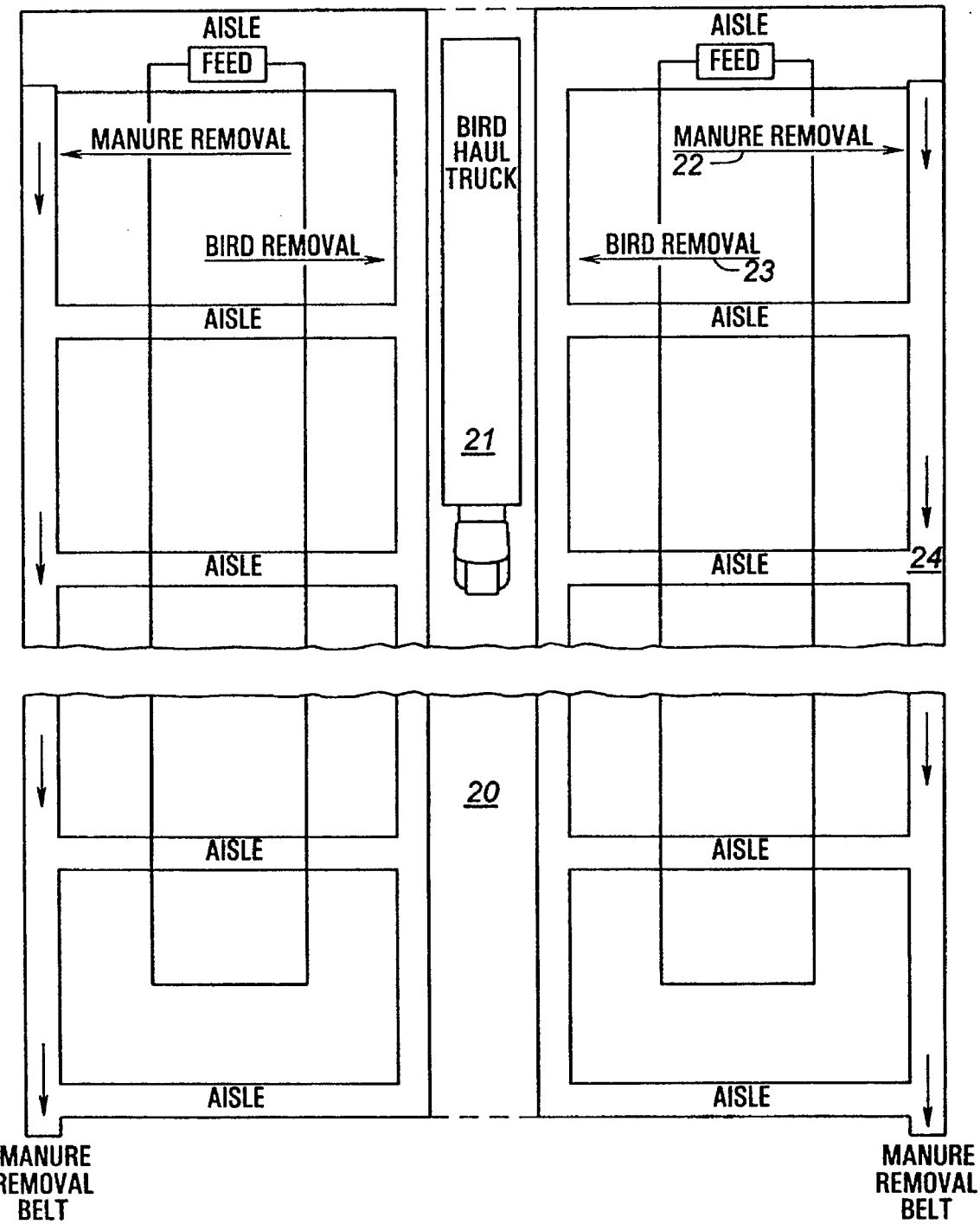
FIG. 2 is a top-view diagram of a proposed layout for multi-level production units using the hemisphere-belt floor system.

Strictly by way of example of the advantages of multi-level production, a farm using the current litter floor system to raise approximately 100,000 birds using 3–5 separate structures, each housing approximately 20,000 birds, could achieve the same production level under a single roofed structure using a multi-level hemisphere-belt floor system. A 90'×238' multi-level structure such as depicted in FIG. 2 would allow production of 90,660 commercial broilers at a density of 0.6 ft$^2$/bird. This is a 317% increase over the 28,560 commercial broilers that could be produced in a 90'×238' single-level structure using the litter system at a density of 0.75 ft$^2$/bird. Since continuous manure removal decreases down-time between broods and, therefore, increases the number of broods which can be raised each year, the production increase expands to 485% (approximately 680,000 birds/year versus approximately 140,000 birds/year).

It will be understood by those of ordinary skill that the foregoing disclosure and description of the invention is merely illustrative and explanatory thereof, and that various changes in the size, materials, and application, as well as in the details of the illustrated construction, may be made without departing from the spirit of the invention.

I claim:

1. An animal cage apparatus, comprising:

a frame for enclosing the animal; and a movable floor mounted adjacent said frame to complete the enclosure of the animal, said floor comprising a plurality of protrusions each having a rounded profile and said plurality of protrusions comprising a majority of said floor.

2. The apparatus of claim 1, wherein:

said floor is formed of a manure-resistant material.

3. The apparatus of claim 2, wherein:

said movable floor is selectively operable in opposed directions.

4. The apparatus of claim 3, wherein:

said movable floor is movable at a faster speed in a first direction than in a second opposed direction.

5. The apparatus of claim 1, wherein:

said protrusions are curved.

6. The apparatus of claim 1, wherein:

said protrusions are hemispherical and arranged in parallel offset rows.

7. The apparatus of claim 2, further comprising:

means for removing from said frame animal waste which drops on said floor.

8. The apparatus of claim 7, wherein:

said means for removing further comprises:

a chute mounted outside said frame to catch animal waste as said floor advances in a first direction;

said floor further comprising a plurality of rollers, said floor reversing direction after moving past said frame and around at least one of said rollers to allow accumulated animal waste to drop off into said chute.

9. The apparatus of claim 8, further comprising:

wash means mounted outside said frame for removing additional waste, which did not fall into said chute from said floor, prior to said floor passing past said frame to support the animal.

10. The apparatus of claim 1, wherein:

said frame further comprises a door;

said movable floor selectively moving toward said door to allow rapid animal removal from said frame.

11. The apparatus of claim 6, further comprising:

means for removing animal waste which drops on said floor from said frame.

12. The apparatus of claim 11, wherein:

said means for removing further comprises:

a chute mounted outside said frame to catch animal waste as said floor advances in a first direction;

said floor further comprising a plurality of rollers, said floor reversing direction after moving past said frame on at least one of said rollers to allow accumulated animal waste to drop off into said chute.

13. The apparatus of claim 12, further comprising:

wash means mounted outside said frame for removing additional waste which did not fall into said chute from said floor prior to said floor passing past said frame to support the animal.

14. The apparatus of claim 13, wherein:

said frame further comprises a door;

said movable floor selectively moving toward said door to allow rapid animal removal from said frame.

15. A substantially vertical stack of broiler cages having at least two levels of cages, each of which comprises:

a frame for enclosing at least one broiler; and a movable floor mounted adjacent said frame to complete the enclosure of the at least one broiler, said floor comprising a plurality of protrusions each having a rounded profile and said plurality of protrusions comprising a majority of said floor.

16. The apparatus of claim 15, wherein:

said floor is formed of a manure-resistant material.

17. The apparatus of claim 16, wherein:

said movable floor is selectively operable in opposed directions.

18. The apparatus of claim 17, wherein:

said movable floor is movable at a faster speed in a first direction than in a second opposed direction.

19. The apparatus of claim 15, wherein:

said protrusions are curved.

20. The apparatus of claim 15, wherein:

said protrusions are hemispherical and arranged in parallel offset rows.

21. The apparatus of claim 20, further comprising:

means for removing from said frame animal waste which drops on said floor.

22. The apparatus of claim 21, wherein:

said means for removing further comprises:

a chute mounted outside said frame to catch animal waste as said floor advances in a first direction;

said floor further comprising a plurality of rollers, said floor reversing direction after moving past said frame and around at least one of said rollers to allow accumulated animal waste to drop off into said chute.

23. The apparatus of claim 22, further comprising:

wash means mounted outside said frame for removing additional waste which did not fall into said chute from said floor prior to said floor passing past said frame to support the animal.

24. The apparatus of claim 20, wherein:

said frame further comprises a door;

said movable floor selectively moving toward said door to allow rapid animal removal from said frame.

\* \* \* \* \*